April 2, 1935. C. AUBRY 1,996,316
LIFTING DEVICE OF THE PORTABLE AND DISMOUNTABLE TYPE,
ADAPTED FOR THE MOUNTING OF VEHICLE WHEELS
Filed Jan. 2, 1934
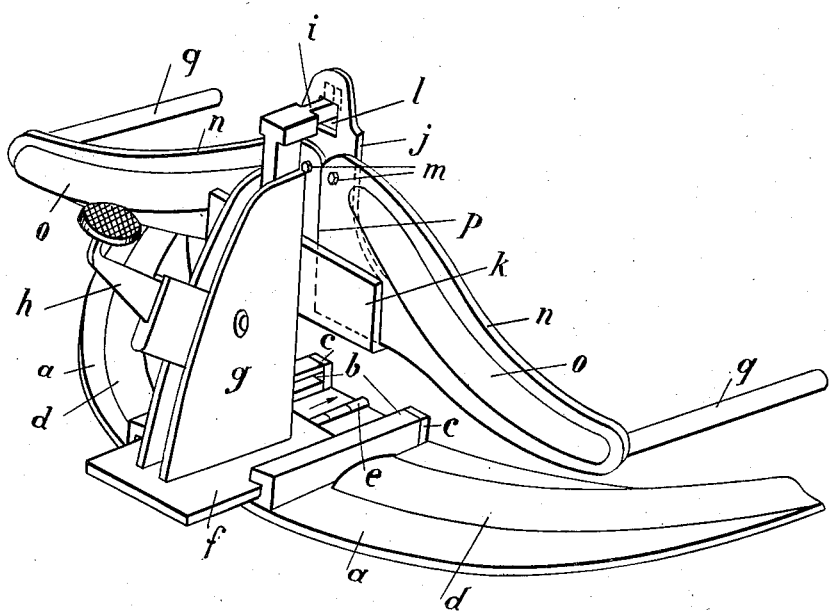

Patented Apr. 2, 1935

1,996,316

UNITED STATES PATENT OFFICE 1,996,316

LIFTING DEVICE OF THE PORTABLE AND DISMOUNTABLE TYPE, ADAPTED FOR THE MOUNTING OF VEHICLE WHEELS

Charles Aubry, Bonneval, France

Application January 2, 1934, Serial No. 704,996
In France May 8, 1933

1 Claim. (Cl. 254—1)

The present invention relates to a lifting device of the portable and dismountable type, adapted for the mounting of vehicle wheels. For this purpose, the said device serves, for instance to lift the wheel in such manner as to bring the holes in the hub into coincidence with the securing pins mounted on the axle or the brake drum. In this position, it is simply necessary to push the wheel laterally in order to mount it completely in place.

The apparatus embodying the present invention comprises a horizontal base, provided with a guide in which may be placed, and held fast, the bottom plate of a jack, which, in its movements, operates a fork with parallel and horizontal arms, upon which the wheel to be placed in position is mounted.

The single figure of the accompanying drawing shows by way of example, and in the operative position, a form of construction of the portable lifting device in conformity to the invention.

As above indicated, the apparatus comprises a crescent shaped horizontal base $a$ which is provided at its middle part with a guide $b$, closed by stop-plates $c$ at the end next the inner edge of the crescent. The ends of the crescent, on either side of the guide $b$, are stiffened by pressed ribs $d$.

In the construction herein represented, the crescent $a$ consists of two symmetrical segments connected together by a hinge $e$ which is located in the plane of symmetry of the guide $b$. In this manner, the two parts of the base $a$ can be folded up, the lower faces of the two segments being placed in contact. The segments are of such radius of curvature that, when the crescent-shaped base is rested on the ground with the concave edge next the wheel, the tips of the crescent extend beneath the wheel.

In the guide $b$ is mounted the bottom plate $f$ of a jack $g$. The operating part consists of a pedal $h$, and the top of the rack forms a hook $i$. Upon this hook may be hung a fork, which consists of a suspension plate $j$ whose lower end is bent into a U shape at $k$. Upon the said plate $j$ are pivotally mounted, in the symmetrical position with reference to the aperture $l$ and upon spindles $m$, the movable arms $n$. The said arms are strengthened by pressed ribs $o$ and comprise right-angled inner ends $p$. The outer ends each carry a perpendicular fork-rod $q$. In the operative position, the arms $n$ are held in position in the U-shaped part $k$, their inner ends $p$ being in contact with one another. The parallel rods $q$ are thus located in the same horizontal plane, and constitute a fork which may receive the load to be lifted.

In mounting a vehicle wheel, the apparatus is placed near the hub of the wheel, the base $a$ being placed below, so that the fork rods, in contact with the ground, will be located on either side of the wheel axle. While holding the upper part of the wheel, the operator acts with his foot upon the jack $g$, and the load can thus be raised to the desired height. At this time, the wheel may be engaged upon its assembling and securing pins, by a lateral thrust. It will be noted that as the fork is suspended, the load can be swung to the right or left in order to place it in position more readily.

After use, the fork portion is removed, and the arms $n$ are turned through 90° in order to bring them together.

In this manner, the space occupied by the apparatus is reduced to such a degree that it can be readily stowed in the box of a vehicle.

I claim:

A portable lifting device for use in fitting vehicle wheels, comprising hingedly connected segments constituting a crescent-shaped base plate adapted to be rested on the ground with the concave edge of said base plate next the wheel, said segments of such radius of curvature that the tips of the crescent extend beneath the wheel, transverse guide members fitted to said segments, a jack slidably fitted in said guide members, a U-shaped suspension plate adapted to be given vertical movements by said jack, a pair of arms articulated to said suspension plate, said arms having vertical edges in abutting relation and extending in opposite directions above said base, and horizontal wheel-supporting rods projecting from the free ends of said arms at right angles to said arms.

CHARLES AUBRY.